United States Patent [19]
Burghoff

[11] Patent Number: 5,235,774
[45] Date of Patent: * Aug. 17, 1993

[54] ENHANCED FISH ATTRACTOR DEVICE

[76] Inventor: Gary Burghoff, 5800 Overseas Hwy., Ste. 35-143, Marathon, Fla. 33050

[ * ] Notice: The portion of the term of this patent subsequent to Jun. 2, 2009 has been disclaimed.

[21] Appl. No.: 891,786

[22] Filed: Jun. 1, 1992

Related U.S. Application Data

[63] Continuation-in-part of Ser. No. 609,906, Nov. 5, 1990, Pat. No. 5,117,577.

[51] Int. Cl.$^5$ .................. A01K 97/02; A01K 93/00
[52] U.S. Cl. .................................. 43/17.1; 43/17.2; 43/17.5; 43/44.99
[58] Field of Search ............. 43/17.1, 17.5, 17, 44.99, 43/42.31, 54.1, 56, 55, 2

[56] References Cited

U.S. PATENT DOCUMENTS

| | | | |
|---|---|---|---|
| 3,105,233 | 9/1963 | D'Amore et al. | 43/17.5 X |
| 3,617,733 | 11/1971 | Adams | 43/17.5 X |
| 3,769,740 | 11/1973 | Lang | 43/44.99 |
| 3,935,660 | 2/1976 | Plew | 43/42.31 |
| 4,020,580 | 5/1977 | Chappell et al. | 43/17.5 |
| 4,190,976 | 3/1980 | Hurt | 43/42.31 X |
| 4,475,301 | 10/1984 | Wortham | 43/17.5 |
| 4,553,194 | 11/1985 | Bailey | 43/17.5 X |
| 4,858,372 | 8/1989 | Ray | 43/17.5 X |
| 4,951,410 | 8/1990 | Ly | 43/17.1 |
| 5,067,269 | 11/1991 | Eppley et al. | 43/17 |

FOREIGN PATENT DOCUMENTS 1012381 12/1965 United Kingdom ............... 43/44.99

Primary Examiner—Mark Rosenbaum
Assistant Examiner—Jeanne M. Elpel
Attorney, Agent, or Firm—Frijouf, Rust & Pyle

[57] ABSTRACT

An apparatus and method is disclosed for an enhanced fish attractor device for use on a surface of a body of water to entice fish. The enhanced fish attractor device comprises a body member having a volume for floating the body member on the surface of the body of water. The body member supports a porous container for receiving the chum material enabling the chum material to migrate through the porous container into the body of water for luring fish thereby. An audible generator and/or an illuminator generate an audible output and/or illuminate the body of water to attract fish thereby. An optional plurality of flexible webs extend from the body member into the body of water for simulating seaweed.

22 Claims, 12 Drawing Sheets

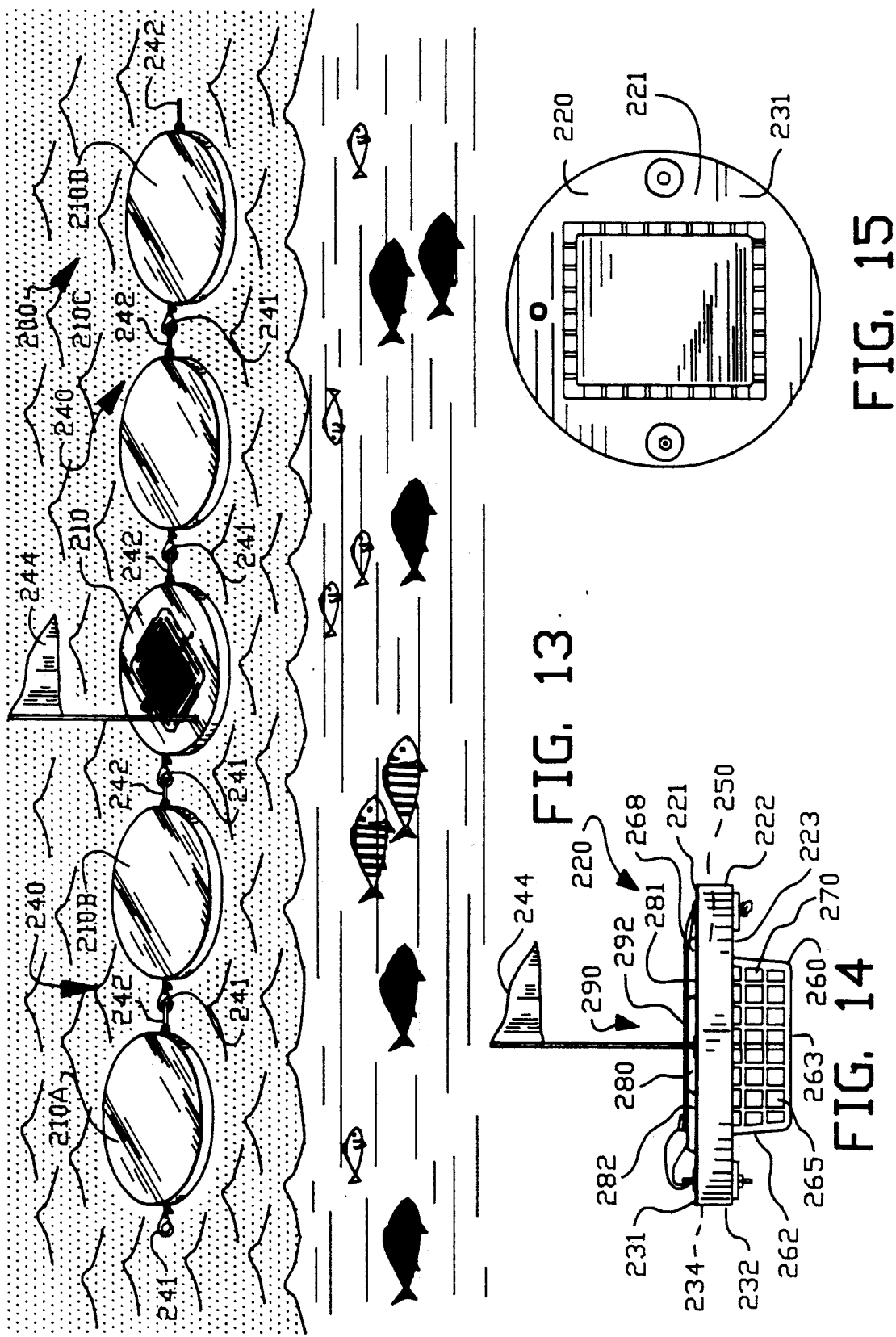

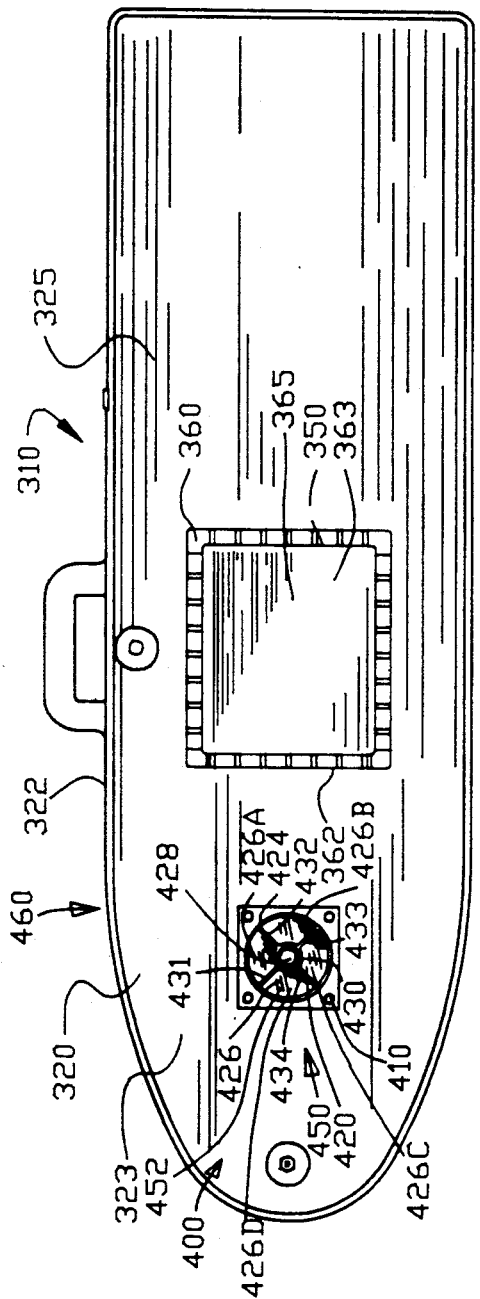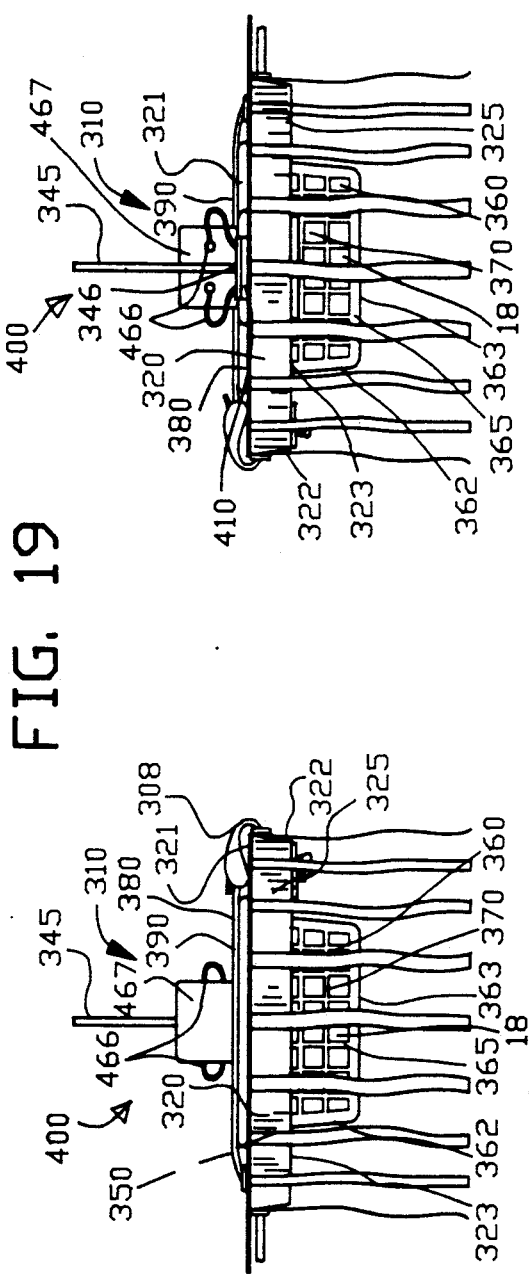

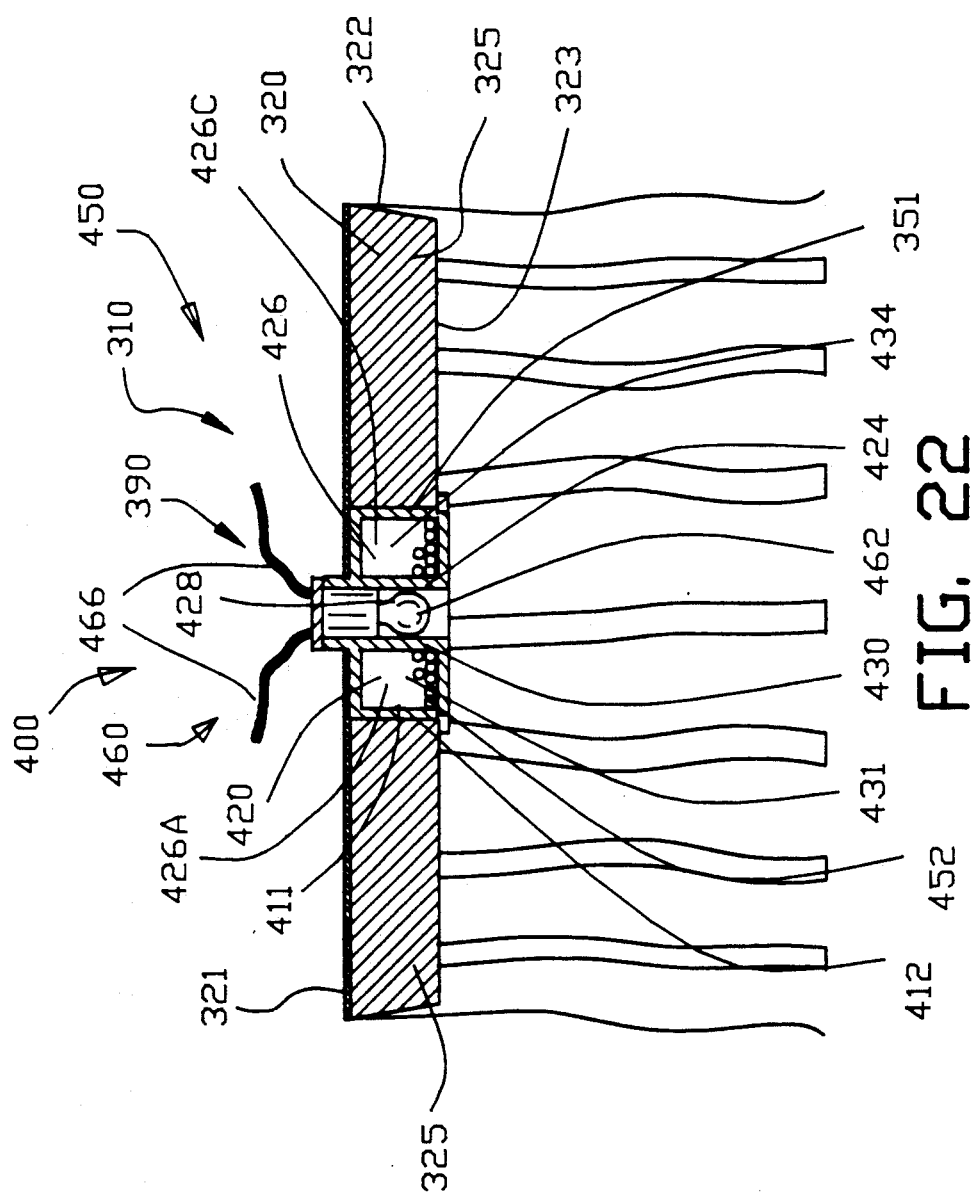

ENHANCED FISH ATTRACTOR DEVICE

CROSS-REFERENCE TO RELATED APPLICATIONS

This is a continuation-in-part of U.S. patent application Ser. No. 609,906 filed Nov. 5, 1990 now U.S. Pat. No. 5,117,577. All subject matter set forth in application Ser. No. 609,906 is hereby incorporated by reference into the present application as if fully set forth herein.

BACKGROUND OF THE INVENTION

1. Field Of The Invention

This invention relates to fishing and more particularly to a device for enticing fish with a chum material, audible sounds and/or illumination and for creating an artificial haven for fish.

2. Background Of The Invention

The process of chumming has been well known in the fishing art for many years. In the process of chumming, a chum material such as portions of fish are dispersed in the body of water. The fish are enticed to the chumming material.

U.S. Pat. No. 1,410,817 to Walter J. Lloyd relates to a fishing appliance device for catching larger sea and fresh water animals and which indicates to an observer at a distant point, as to whether anything has been caught upon the hook, or other element associated with the fishing appliance.

U.S. Pat. No. 3,006,105 to Elmer Lewis relates to an improvement in fishing tackle comprising a casting float having means for distributing chum within a selected fishing area.

U.S. Pat. No. 3,084,471 to Alspaugh discloses an apparatus for controlling the disposition of a fishing line relative to a fixed support.

U.S. Pat. No. 3,717,124 to Jacobs illustrates a fish culture cage assembly which includes an annular float ring having a foraminous, cylindrical cage structure having an open upper end and a closed lower end detachably depending from the flange and a lid detachably secured to the float ring and covering the open top of the cage structure. A cylindrical feeding ring may be detachably suspended from projections inside the foraminous cage in the upper portion thereof. The feed ring has a plurality of openings which are substantially smaller than the openings through the cage, the feed ring being open at the upper and lower ends.

U.S. Pat. No. 4,297,804 to Weld discloses a floating container which is shaped like a small boat to be pulled behind a fishing vessel. The container is transparent so that the bait carried therein can be seen and thus attract game fish in the surrounding water. The container is structured to provide proper aeration for the bait while allowing access to the bait.

U.S. Pat. No. 4,638,593 to Garcia teaches a boat-shaped fishing accessory comprises an enclosed hull having a live bait compartment and an adjoining insulated compartment for storing food beverages and other articles. A pair of tubular rod holders are angularly disposed on each side of the hull to receive and hold fishing rods.

U.S. Pat. No. 4,903,429 to Tetenes discloses a device to attract fish consisting of a bucket held within a net suspended downwardly from a float into a body of water. The bucket holds frozen fish chum so that open top of the bucket is at a right distance below water line allowing pieces of defrosted fish chum to be dispensed from the bucket and float on the water to attract the fish.

In my prior invention set forth in U.S. Pat. No. 5,117,577, I disclosed an improved fish attractor device comprising a body member having an aperture for receiving a porous container for enabling a chum material within the container to migrate into a body of water for luring fish thereby.

It is an object of the present invention to improve upon my prior invention and to provide an enhanced fish attractor device with superior fish attracting capabilities.

Another object of this invention is to provide an enhanced fish attractor device incorporating audible means for generating an audible output in the body of water to attract fish thereby.

Another object of this invention is to provide an enhanced fish attractor device incorporating illumination means for illuminating the body of water to attract fish thereby.

Another object of this invention is to provide an enhanced fish attractor device incorporating a plurality of flexible webs secured to the body member for immersion in the body of water for simulating seaweed.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an enhanced fish attractor device for use on a surface of a body of water to entice fish with a chum material. The enhanced fish attractor device comprises a body member having a body member top surface, a body member bottom surface and body member side surface means. The body member top surface, body member bottom surface and body member side surface means define a body member volume for floating the body member on the surface of the body of water. An aperture is disposed in the body member wit the aperture extending between the top surface and the bottom surface of the body member. A container having container side surface means extends from a container bottom surface for defining a container internal volume. The container side surface includes a container peripheral rim for defining an open top of the container. The container is receivable within the aperture in the body member with the container peripheral rim of the container engaging with the top surface of the body member and with the container bottom surface disposed below the surface of the body of water. The container side surface means is porous for enabling the chum material to be inserted within the container internal volume and to migrate through the container side surface means into the body of water for luring fish with the chum material. An audible means is secured to the body member for generating an audible output in the body of water to attract fish thereby.

In a more specific embodiment of the invention, the audible means comprises a receptacle having an interior surface defining an internal receptacle volume and an external surface. The receptacle is secured to the body member with at least a portion of the external surface contacting the body of water with the audio generator being disposed in the internal receptacle volume for generating an audible signal. The receptacle transfers the audible signal from the internal receptacle volume to the external surface of the receptacle for generating the audible output in the body of water.

The audio generator may comprises a movable mass disposed in the internal receptacle volume for generating an audible signal upon the movable mass impacting the interior surface of the receptacle. In the alternative, the audio generator may comprise an electronic audio generator.

In one embodiment of the invention, an illumination means is secured to the body member for illuminating the body of water to attract fish thereby. The illumination means may be an intermittent illuminating means for intermittently illuminating the body of water. The illumination means may be disposed in the internal receptacle volume of the receptacle.

In another embodiment of the invention, a locating light is secured to the body member for indicating the position of the enhanced fish attractor device. Preferably, the enhanced fish attractor includes a locating flag secured to the body member for locating the body member with the locating light secured to the locating flag.

In still another embodiment of the invention, the enhanced fish attractor device includes a plurality of flexible webs each having a first and a second web end with the first ends of each of the plurality of webs being secured to the body member. The plurality of webs are immersed in the body of water for simulating seaweed. Preferably, the plurality of flexible webs are constructed of a polymeric material and have a web longitudinal length approximately one-half of the longitudinal length of the body member. The plurality of flexible webs are uniformly secured about the body member perimeter of the body member.

The foregoing has outlined rather broadly the more pertinent and important features of the present invention in order that the detailed description that follows may be better understood so that the present contribution to the art can more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 13 is an isometric view of a second embodiment of a plurality of improved fish attractor devices;

FIG. 14 is a side elevational view of the improved fish attractor device of FIG. 13;

FIG. 15 is a top view of FIG. 13;

FIG. 19 is a bottom view of FIG. 17;

FIG. 20 is a front view of FIG. 17;

FIG. 21 is a rear view of FIG. 17;

FIG. 22 is a sectional view along line 22—22 in FIG. 17;

Similar reference characters refer to similar parts throughout the several Figures of the drawings.

DETAILED DISCUSSION

Figure 1:
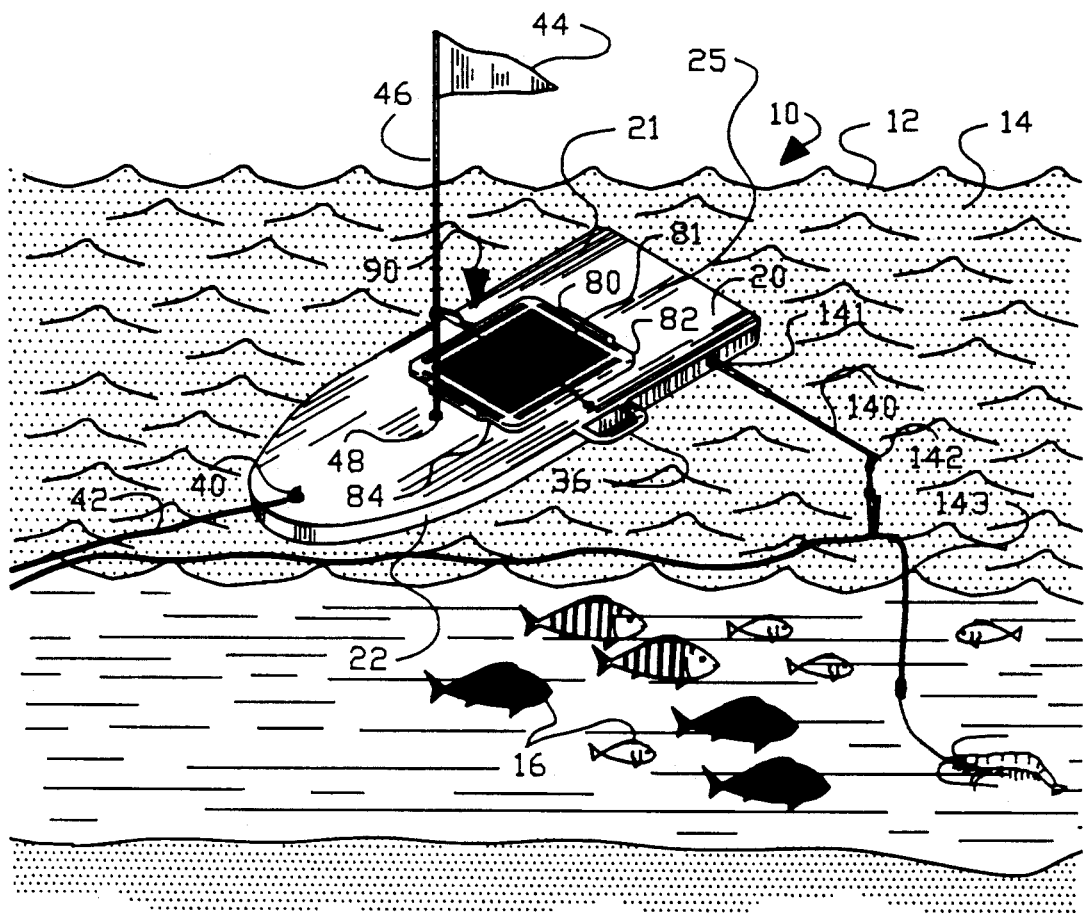
FIG. 1 is an isometric view of a first embodiment of an improved fish attractor device.
Figure 2:
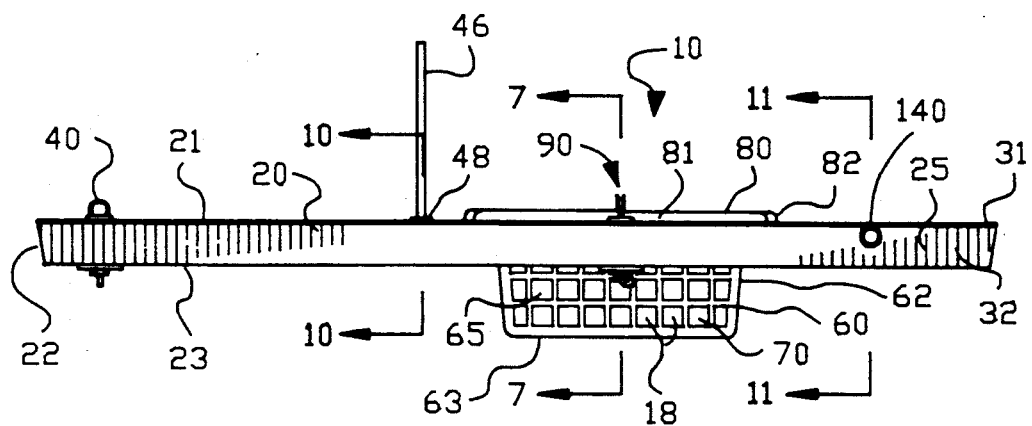
FIG. 2 is a side elevational view of the improved fish attractor device of FIG. 1.
Figure 3:
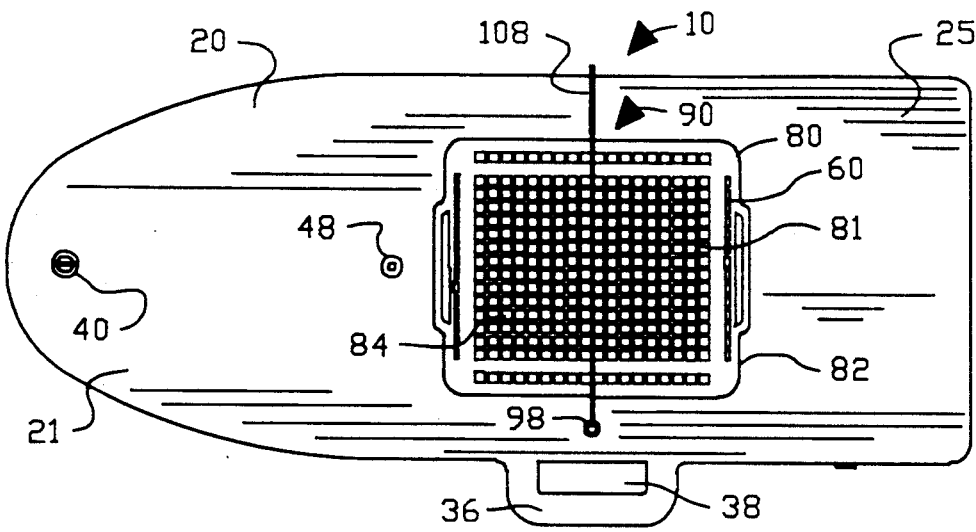
FIG. 3 is a top view of FIG. 2.
Figure 4:
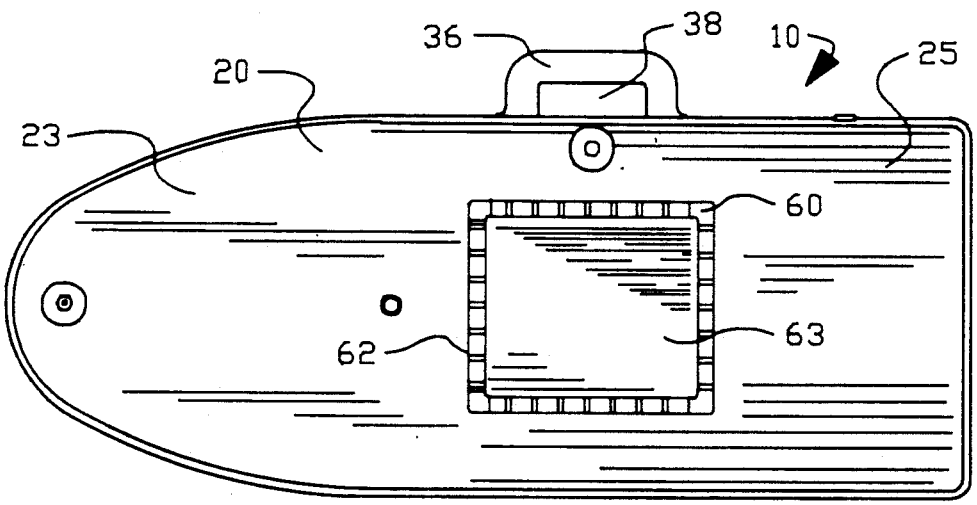
FIG. 4 is a bottom view of FIG. 2.
Figure 5:
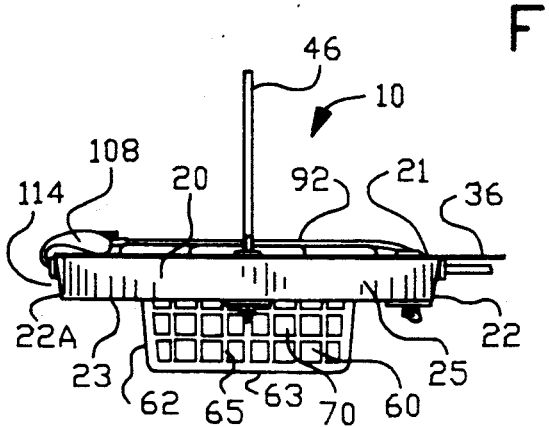
FIG. 5 is a front view of FIG. 2.
Figure 6:
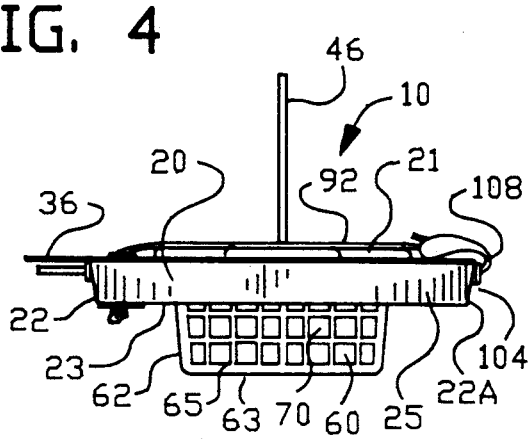
FIG. 6 is a rear view of FIG. 2.

FIG. 1 is an isometric view of a first embodiment of an improved fish attractor device 10 of the present invention with FIGS. 2-6 illustrating additional views thereof. The improved fish attractor device 10 is adapted for use on a surface 12 of a body of water 14 to entice fish 16 with a chum material 18. The fish attractor device 10 comprises a body member 20 having a body member top surface 21, body member side surface means 22 and a body member bottom surface 23. The body member top surface 21, the body member side surface means 22 and the body member bottom surface 23 define a body member volume 25 for floating the body member 20 on the surface 12 of the body of water 14 as shown in FIG. 1.

Figure 7:
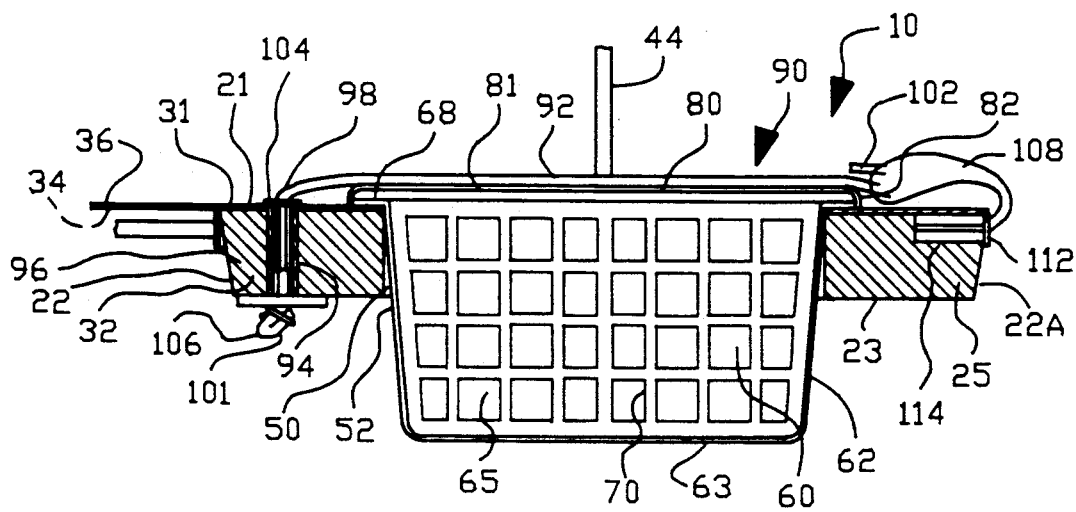
FIG. 7 is a sectional view along line 7—7 in FIG. 2.
Figure 8:
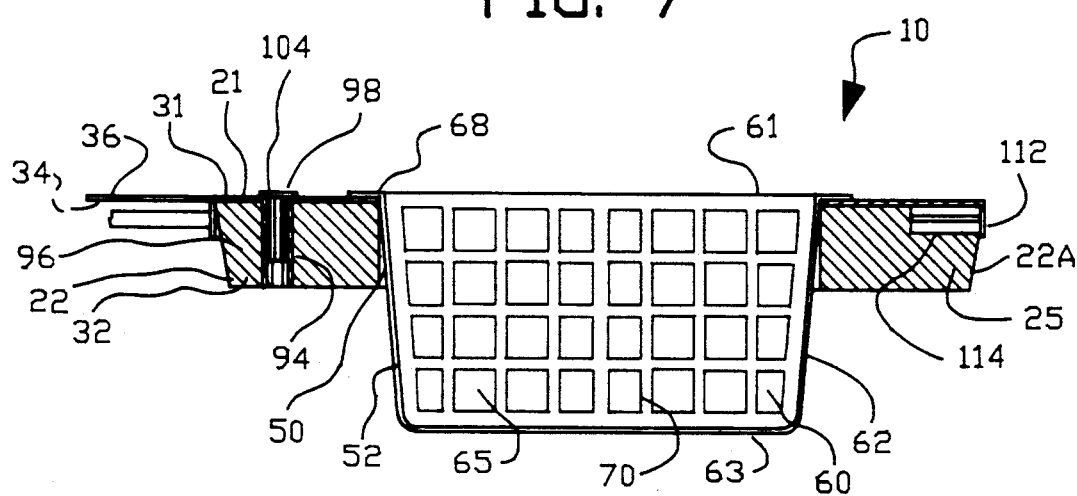
FIG. 8 is a sectional view similar to FIG. 7 with a cover being removed.
Figure 9:
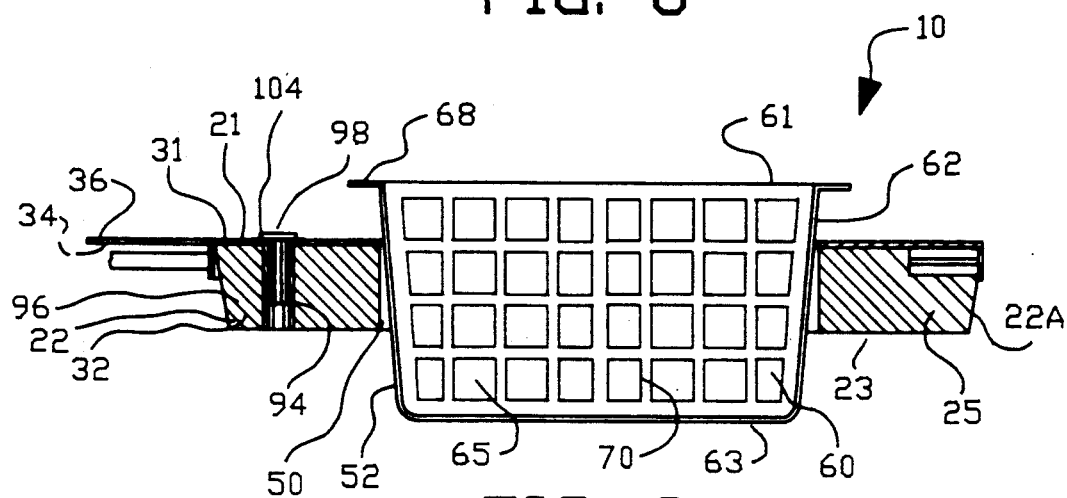
FIG. 9 is a sectional view similar to FIG. 7 with a container being removed.

As better shown in FIGS. 7-9, the body member 10 comprises an upper rigid material 31 bonded to a lower foam material 32. Preferably, the upper sheet of rigid material 31 is a generally rigid plastic material bonded by an adhesive 34 to the lower sheet of a foam material 32 which is preferably a low cost closed cell foam such as styrofoam.

The body member 20 supports a carrying handle 36 for carrying the fish attractor device 10 to and from the body of water 14. In this embodiment, the carrying handle 36 is integrally formed as a projection from the upper rigid material 31 with a slot 38 defining a hand receiving region.

A coupling means 40 is attached to the body member 20 for receiving a rope 42 for anchoring or towing the improved fish attractor device 10. A locating flag 44 attached to a flag pole 46 is removably received in a grommet 48 secured to the body member 20. The locating flag 44 assists in the location of the fish attractor device 10 in the body of water 14.

The lower foam material 32 defines a portion of the body member side surface means 22 which is tapered from the body member top surface 21 to the body member bottom surface 23 to provide a proper fluid dynamic shape in the event that the fish attractor device 10 is towed behind a boat or the like. In addition, the fish attractor device 10 may be released from a shoreline or a boat (not shown) to drift away from the shoreline or boat to a remote location limited by the rope 42.

An aperture 50 is defined in the body member 20 and extends between the body member top surface 21 and the body member bottom surface 23 of the body member 10. The aperture 50 defines aperture side surface means 52 extending substantially perpendicular to the top surface 21 of the body member 20.

A container 60 has an open top 61 defined by container side surface means 62 extending from a container bottom surface 63. The container side surface means 62 and the container bottom surface 63 define a container internal volume 65. The container side surface means 62 includes a container peripheral rim 68 extending about the open top 61 of the container 60. The container side surface means 62 includes pores 70 for enabling the chum material 18 to be inserted within the container internal volume 65 and to migrate through the pores 70 of the container side surface means 62. The container side surface means 62 tapers from the container peripheral rim 68 to the container bottom surface 63. Preferably, the container 60 is a unitary resilient material, such as plastic or the like for enabling the container to readily cleaned of any remaining chum material 18 after use of the present invention.

FIGS. 1-7 illustrate the container 60 received within the aperture 50 in the body member 20 with the container peripheral rim 68 engaging with the top surface 21 of the body member 20. As best shown in FIG. 7, the container side surface means 62 resiliently engage the aperture side surface means 52 to secure the container 60 to the body member 20. A portion of the container side surface means 62 and the container bottom surface 63 is disposed below the surface 12 of the body of water 14 for enabling the chum material 18 to migrate through the pores 70 into the body of water 14 for luring the fish 16 thereby.

A container cover 80 comprises a cover lid 81 and a cover peripheral rim 82 for covering the open top 61 of the container 60. The cover lid 81 overlies the open top 61 of the container when the cover peripheral rim 82 engages with the top surface 21 of the body member 20. The cover lid 81 includes pores 84 for enabling water flow therethrough.

A retaining means 90 including an elastic cord 92 secures the container cover 80 to the body member 20. A vertical tube 94 is secured by adhesive or the like to a vertical orifice 96 defined in the body member 20. A plug 98 is received within the vertical tube 96 with a first end 101 of the elastic cord 92 extending through a hole 104 in the plug 98. The first end 101 is secured to the hole 104 in the plug 98 by conventional means such as a knot 106. A second end 102 of the elastic cord 92 is secured to a hook 108. The hook 108 is receivable within an indentation 112 of a grommet 114 adhesively mounted to the body member side surface 22A for securing the container cover 80 to the body member 20 as shown in FIGS. 1-7.

Since the tension force of the elastic cord 92 is applied in a horizontal direction and parallel to the top surface 21 of the body member 20, the horizontal tension force does not provide a vertical force to extract the plug 98 from the vertical tube 96. Accordingly, the plug 98 may be fictionally secured within the vertical tube 96 enabling the plug 98 and the interior of the vertical tube 96 to be readily cleaned after use.

FIG. 8 illustrates the elastic cord 92 and the plug 98 as well as the container cover 80 removed from the body member 20. The removal of the container cover 80 enables the chum material 18 to be inserted within the container internal volume 65 of the container 60.

FIG. 9 illustrates the removal of the container 60 from the body member 20 for cleaning and/or storage. The container 60 may be replaced with another container (not shown) having pores of a different size relative to the pores 70 of the container 60. A different size pore will alter the porosity of the container side surface means 62 and accordingly alter the rate of migration of the chum material 18 into the body of water 14.

Figure 10:
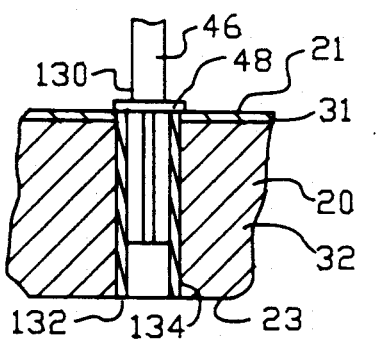
FIG. 10 is a sectional view along line 10—10 in FIG. 2.

FIG. 10 is a detailed sectional view of the flag pole 46 being frictionally received within a grommet hole 130 in the grommet 48. The grommet 48 is secured to a vertical tube 132 mounted in a vertical hole 134 in the body member 20. The locating flag 44 and flag pole 46 assists in the location of the fish attractor device 10 in the body of water 14 and may be readily removed for transportation and storage.

Figure 11:
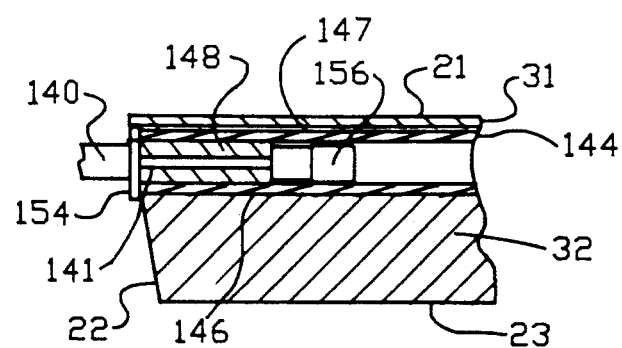
FIG. 11 is a sectional view along line 11—11 in FIG. 2.

FIG. 11 is an enlarged isometric view of a portion of the first embodiment shown in FIG. 1 showing an outrigger pole 140 having a proximal end 141 and a distal end 142. The outrigger pole is mounted to the body member 20 for releasably securing a fishing line 143. A horizontal tube 144 is secured by adhesive or the like to a horizontal orifice 146 defined in the lower foam material 32 of the body member 20 as well as being secured by an adhesive 147 to the upper rigid material 31 of the body member 20. This plural adhesion to the lower foam material 32 as well as the upper rigid material 31 provides a secure mounting for the outrigger pole 140.

A plug 148 is frictionally received within the horizontal tube 144 with the proximal end 141 of the outrigger pole 140 slidably extending through a hole 154 in the plug 148. The proximal end 141 is slidably secured to the hole 154 in the plug 148 by a stop 156. The stop limits the outward extension of the outrigger pole 140.

Figure 12:
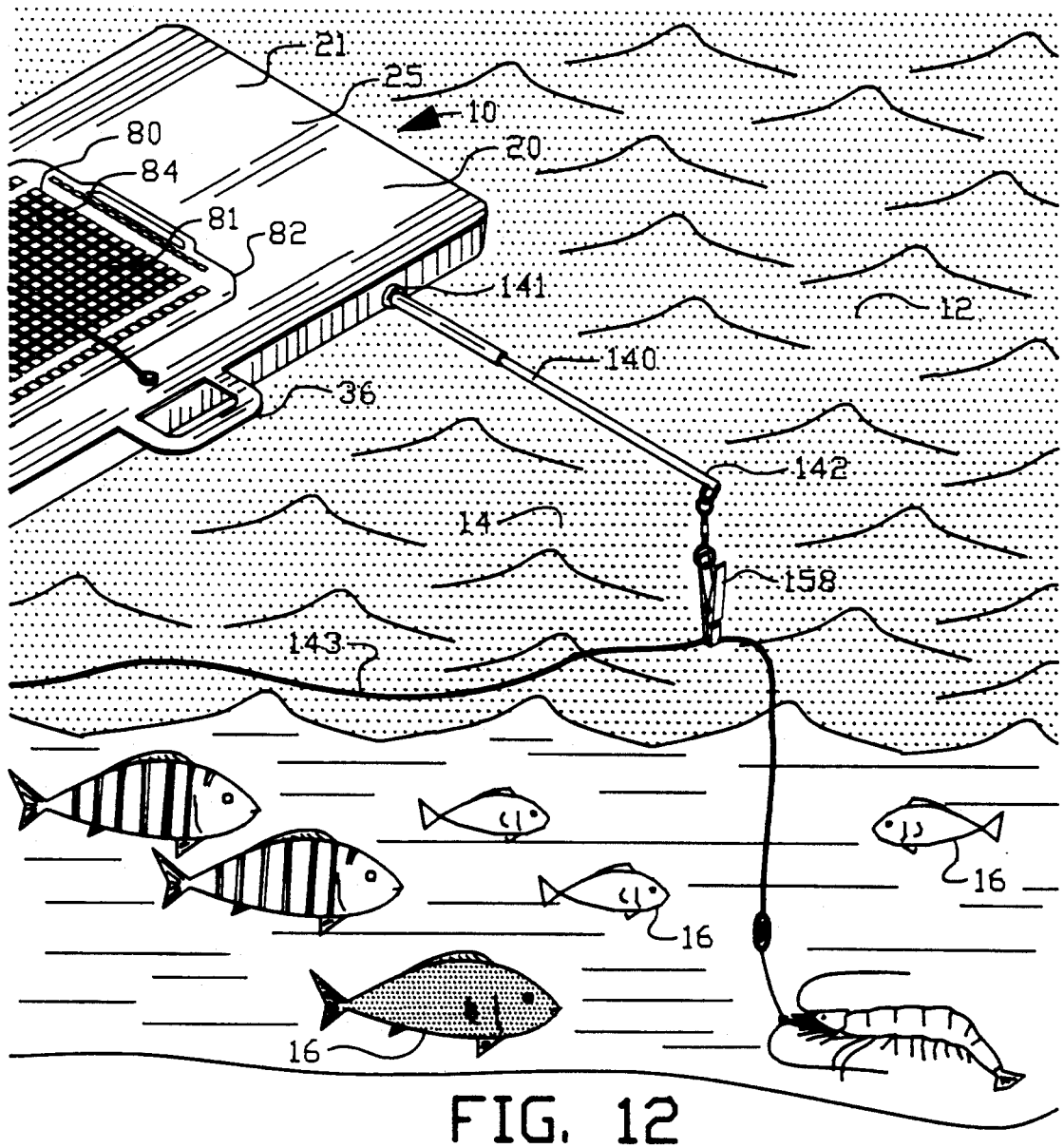
FIG. 12 is an enlarged isometric view of a portion of the first embodiment shown in FIG. 1.

As best shown in FIG. 12, the distal end 142 of the outrigger pole 140 supports an outrigger release 158 for releasably holding the fishing line 143. The operation of a outrigger release should be well known to those skilled in the art. The outrigger pole 140 may be moved between a retracted position and an extended position. The outrigger pole 140 is moved into the extended position during use and is moved into the retracted position for transportation and storage. Since the plug 148 is frictionally received within the horizontal tube 144, the plug 148 and the outrigger pole 140 may be removed for readily cleaning the interior of the horizontal tube 144.

FIG. 13 is an isometric view of a second embodiment of an improved fish attractor device 200 comprising a plurality of fish attractor devices 210 and 210A-210D with FIG. 14 being a side elevational view and FIG. 15 being a top view of the fish attractor. Each of the fish attractor devices 210 and 210A-210D comprises a body member 220 having a body member top surface 221, body member side surface means 222 and a body member bottom surface 223 defining a body member volume 225 for floating the body member 220.

The body member 210 comprises an upper rigid material 231 bonded to a lower foam material 232 bonded together by an adhesive 234. Coupling means 240 comprising a first and a second coupling 241 and 242 is attached to opposed ends of the body member 210 for linking the plurality of body members 210 and 210A-210D enabling the plurality of body members 210 and 210A-210D to shade a portion of the body of water 14 to create an artificial haven for fish. A locating flag 244 may be optionally attached to the body member 210 for assisting in the location of the plurality of body members 210 in the body of water 14.

An aperture 250 is defined in the body member 210 to extend between the body member top surface 221 and the body member bottom surface 223. A container 260 similar to container 60 has an open top defined by container side surface means 262 extending from a container bottom surface 263 to establish a container internal volume 265. A container peripheral rim 268 extends about the open top of the container 260. The container side surface means 262 tapers from the container peripheral rim 268 to the container bottom surface 263 and includes pores 270 for enabling the chum material 18 to migrate through the pores 270 of the container side surface means 262.

The container 260 is received within the aperture 250 with the container peripheral rim 268 engaging with the top surface 221 and with the container side surface means 262 resiliently engaging the aperture 250 to secure the container 260 to the body member 210. A container cover 280 comprising a cover lid 281 and a cover peripheral rim 282 overlies the open top 261 of the container 260 when the cover peripheral rim 282 engages with the top surface 221. A retaining means 290 including an elastic cord 292 secures the container cover 280 to the body member 210 in a manner similar to FIGS. 1-12. The coupling means 240 enables the plurality of body members 210 and 210A-210D to be interlinked to enable the plurality of body members 210 and 210A-210D to shade a portion of the body of water 14 to create an artificial haven for fish. The shade portion provided by the plurality of interlinked body members 210 attracts small fish as a secure environmental haven. The presence of the small fish attract larger fish which feed upon the smaller fish. Accordingly, the plurality of interlinked body members 210 and 210A-210D not only provides a shade area to establish a secure environmental haven for small fish but also provides a platform for releasing the chum material 18 at a controlled rate through the pores 270 of the container side surface means 262.

The improved fish attractor device of the present invention provides a body member having an aperture for receiving a porous container for enabling a chum material within the container to migrate into a body of water for luring fish thereby.

The invention may incorporate an outrigger for releasably securing a fishing line wherein the outrigger may be moved between a retracted position and an extended position. A plurality of body members may be interlinked to shade a portion of the body of water to create an artificial haven for fish. The fish attractor device is low cost, reliable and easy to clean after use.

The fish attractor device of the present invention is specifically designed to ride upon currents of oceans and rivers to remove the fish attractor device from human activity and transport a baited line of a fisherman to a remote location. The fish attractor device may be released from a boat or from shore to drift by a current to the remote location. At the remote location, the body member shades a portion of the body of water to create an artificial haven for fish.

The fish attractor device of the present invention may be released from a shoreline or a boat (not shown) to drift away from the shoreline or boat to a remote location limited by the rope 42. Concomitantly therewith, the fish attractor device carries the fishing line 143 to the remote location. At the remote location, the fish attractor device shades the body of water thereby creating an artificial haven for fish as well as allowing the chum material to migrate from the container for luring fish thereby.

Figure 16:
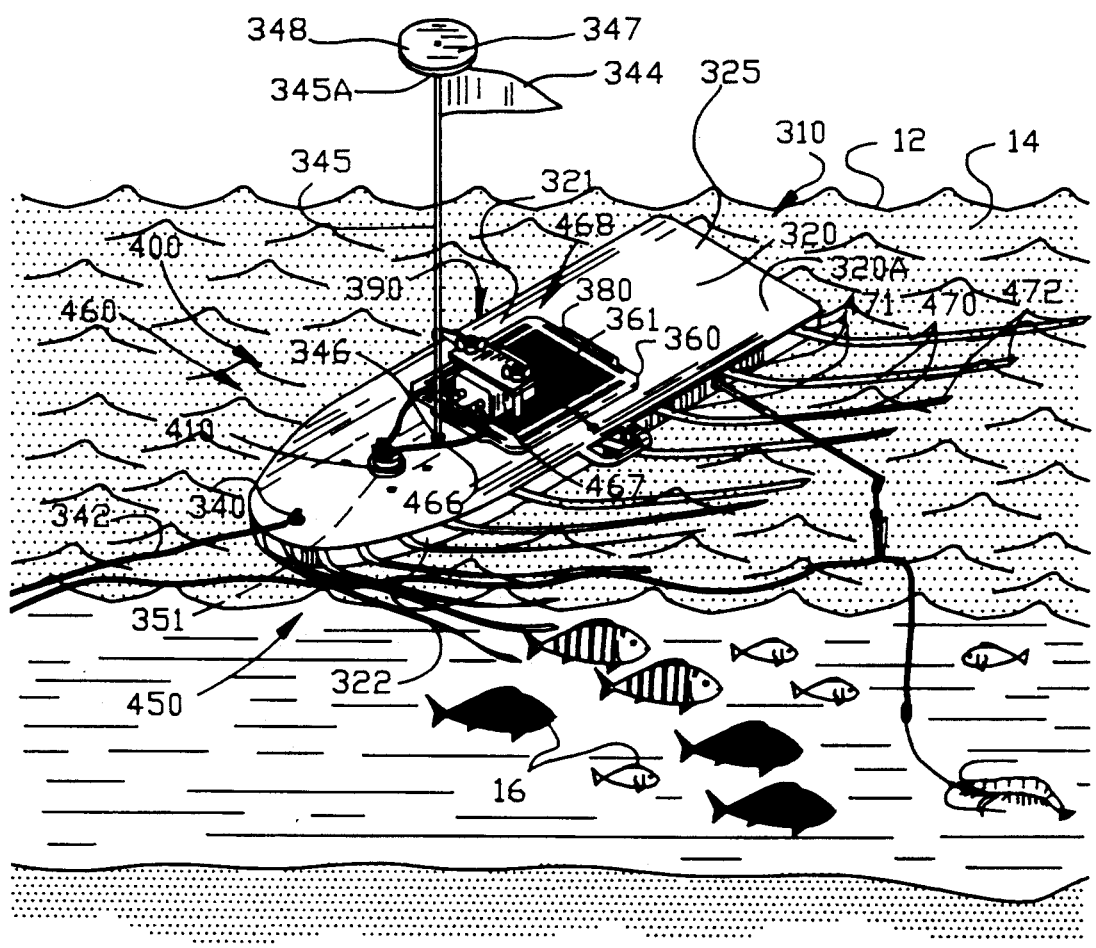
FIG. 16 is an isometric view of a third embodiment of an enhanced fish attractor device.
Figure 17:
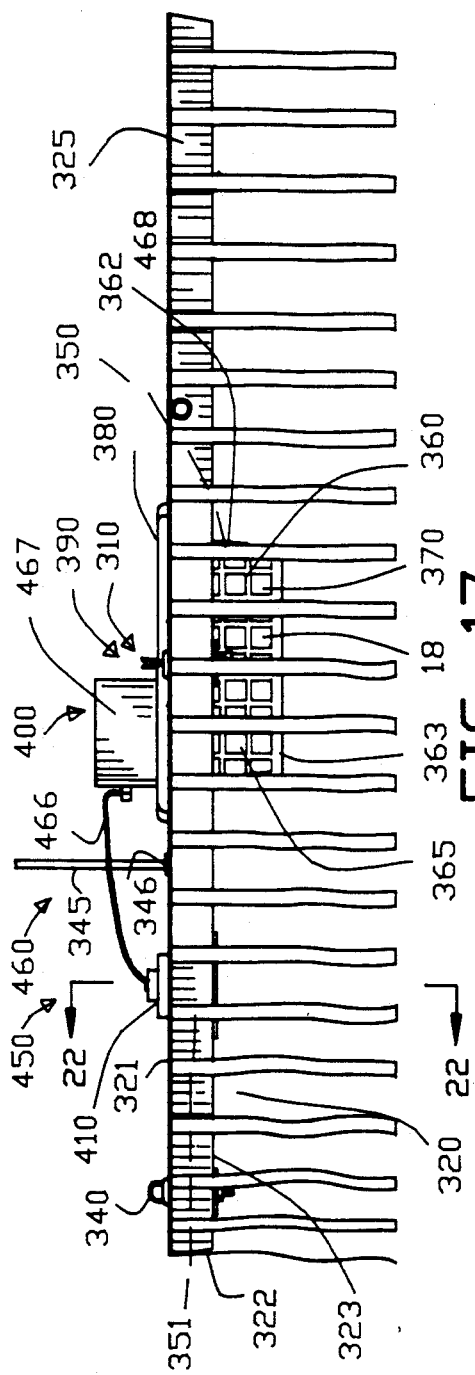
FIG. 17 is a side elevational view of the enhanced fish attractor device of FIG. 16.
Figure 18:
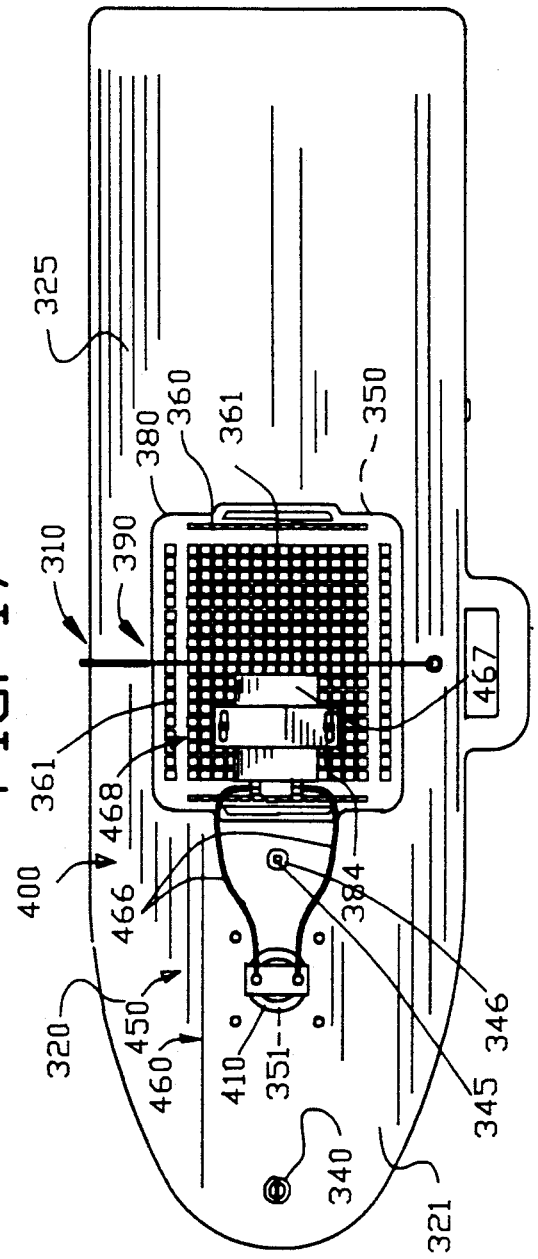
FIG. 18 is a top view of FIG. 17.

FIG. 16 is an isometric view of a third embodiment of enhanced fish attractor device 310 of the present invention with FIGS. 17-22 illustrating additional views thereof. The enhanced fish attractor device 310 is similar to the improved fish attracting device 10 of FIGS. 1-12 comprising a body member 320 having a body member top surface 321, body member side surface means 322 and a body member bottom surface 323 defining a body member volume 325 for floating on the surface 12 of the body of water 14.

A coupling means 340 is attached to the body member 320 for receiving a rope 342 for anchoring or towing the enhanced fish attractor device 310. A locating flag 344 attached to a flag pole 345 is removably received in a grommet 346 secured to the body member 320 to assist in the location of the enhanced fish attractor device 310. A locating light 347 is secured to an upper end 345A of the flag pole 345 for indicating the position of the enhanced fish attractor device 310 under low light conditions. Preferably, the locating light 347 comprises a housing 348 enclosing a conventional battery and omni directional light source (not shown). The locating light 347 provides a continuous low level illumination for enabling a fisherman to cast a bait toward the enhanced fish attractor device 310 under low light conditions. In the alternative, the housing 348 may enclose a battery and a conventional intermittent or flashing light source (not shown).

A first aperture 350 is defined in the body member 320 and extends between the body member top surface 321 and the body member bottom surface 323 of the body member 310. A container 360 has an open top 361 defined by container side surface means 362 extending from a container bottom surface 363 for defining a container internal volume 365. In a manner similar to the improved fish attracting device 10 of FIGS. 1-12, the container 360 is received within the aperture 350 for enabling the chum material 18 to migrate through pores 370 into the body of water 14 for luring the fish 16 thereby. A container cover 380 covers the open top 361 of the container 360 with a retaining means 390 securing the container cover 380 to the body member 320.

The enhanced fish attractor device 310 comprises audible means 400 secured to the body member 320 for generating an audible output in the body of water to attract fish 16 thereby. As best shown in FIGS. 19 and 22, the audible means 400 comprises a receptacle 410 having an internal surface 411 and an external surface 412 with the internal surface 411 defining an internal receptacle volume 420. A second aperture 351 is disposed in the body member 320 with the second aperture 351 extending between the top surface 321 and the bottom surface 323 of the body member 320. The receptacle 410 is secured within the second aperture 351 in the body member 320 with at least a portion of the external surface 412 of the receptacle 410 being disposed below the bottom surface 323 of the body member 320. The receptacle 410 may be secured within the second aperture 351 in the body member 320 by either mechanical or adhesive fastening or by a friction fit.

An internal partition means 424 is located within the internal receptacle volume 420 for partitioning the internal receptacle volume 420 into a first and a second internal volume 426 and 428. In this embodiment, the internal partition means 424 comprises a central cylindrical partition 430 and radial partitions 431–434 for separating the first internal volume into volume elements 426A–426D disposed about the second internal volume 428.

An audio generator 450 is disposed in the first internal volume 426 of the receptacle 410 for generating an audible signal in the body of water 14 to attract the fish 16 thereby. In this embodiment, the audio generator 450 comprises a movable mass shown as a plurality of spherical masses 452 disposed in the volume elements 426A–426D of the first internal volume 426 of the internal receptacle volume 420 for generating an audible signal upon the movable masses 452 impacting the internal surface 411 of the receptacle 410. The movable masses 452 impact the internal surface 411 of the receptacle 410 to generate the audible signal upon the movement of the enhanced fish attractor device 310 due to wave movement of the body of water 14. As the enhanced fish attractor device 310 rolls and pitches due to wave movement of the body of water 14, the plurality of spherical masses 452 strike the internal surface 411 of the receptacle 410 to generate the audible signal to audibly attract the fish 16 within the body of water 14. The reduced volume elements 426A–426D of the first internal volume 426 defined by the internal partition means 424 limit the movement of the plurality of the spherical masses 452 to reduce any imbalance in the body member 320 due to the movement of the plurality of the spherical masses 452.

An illumination means 460 is secured to the body member 320 for illuminating the body of water 14 to attract the fish 16 thereby. In this embodiment, the illumination means 460 comprises a bulb 462 disposed in the second internal volume 428 of the internal receptacle volume 420 of the receptacle 410. The illumination means 460 includes electrical connectors 466 for connection to a battery 467 to power the bulb 462. A battery fastener shown generally as 468 removably secures the battery 467 to the body member 320.

The receptacle 410 is transparent for allowing continuous light from the illumination means 460 to project downwardly into the body of water 14 to visually attract the fish 16 within the body of water 14. The cylindrical partition 430 separates the plurality of spherical masses 452 within the first internal volume 426 of the internal receptacle volume 420 from the bulb 462 located within the second internal volume 428 of the internal receptacle volume 420 to prevent damage to the bulb 462 by the plurality of spherical masses 452.

The enhanced fish attractor device 310 includes a plurality of flexible webs 470 each having a first and a second web end 471 and 472. Preferably, the plurality of flexible webs 470 are constructed of a polymeric material such as flexible polyethylene having a thickness of approximately 0.010 inches, a width of approximately 2.0 to 3.0 inches and a longitudinal length of approximately 50% to 100% the longitudinal length of the body member 320.

The first ends 471 of each of the plurality of webs 470 is secured to a perimeter 320A of the body member 320 enabling the plurality of webs 470 to be immersed in the body of water 14 for simulating seaweed. Preferably, the plurality of flexible webs 470 are uniformly secured about the body member perimeter 320A of the body member 320. The plurality of flexible webs 470 may be secured to the perimeter 320A of the body member 320 by various means such mechanical fastening, adhesive fastening and the like. The protection provided by the body member 320 in combination with the additional protection provided by the plurality of flexible webs 470 simulating weeds furnish an attractive and safe haven for small fish 16. It should be appreciated by those skilled in the art that the chum 18 in combination with the audio signals and/or illumination provide a primary attraction to this safe haven for the fish 14.

Figure 23:
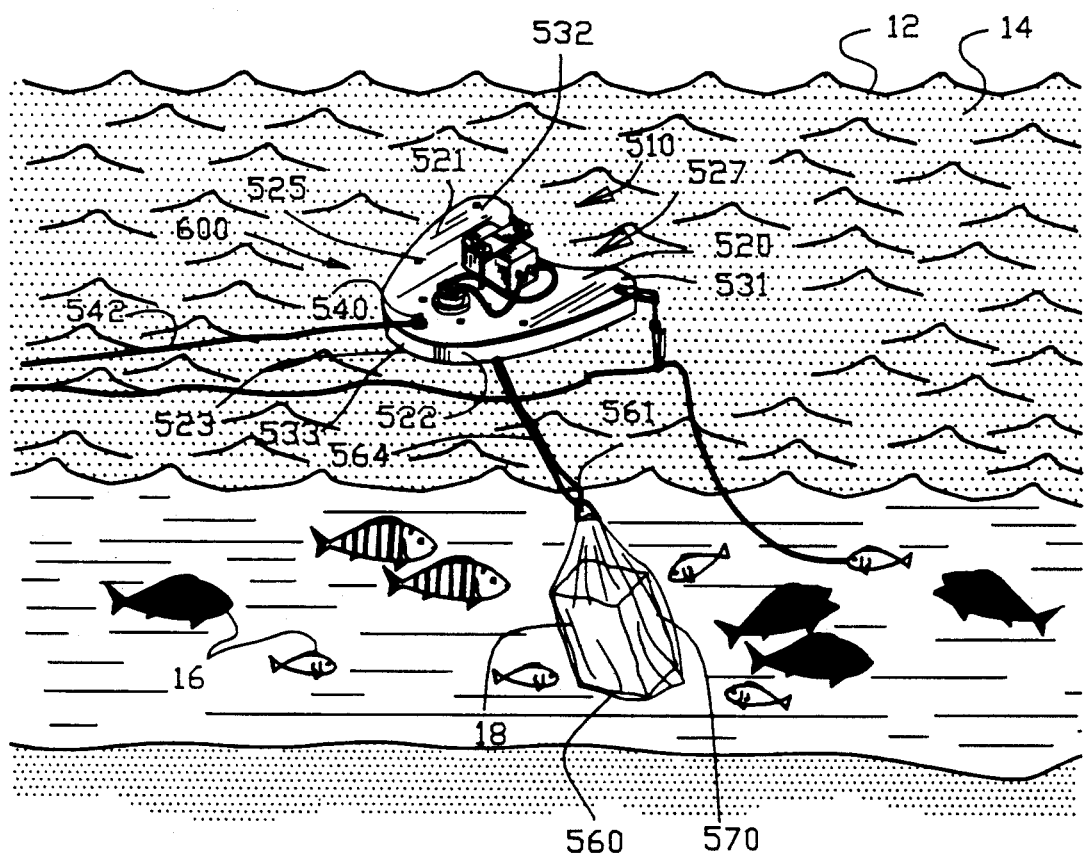
FIG. 23 is an isometric view of a fourth embodiment of an enhanced fish attractor device.
Figure 24:
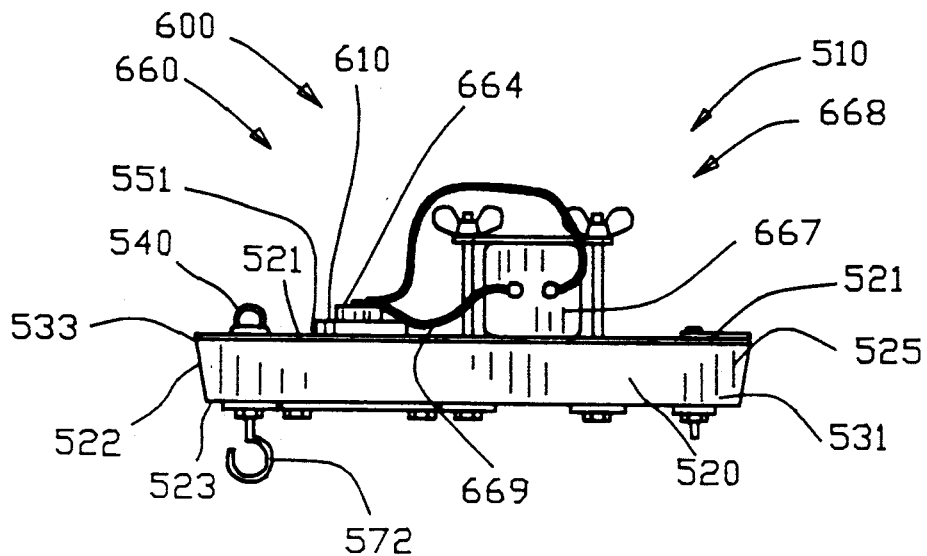
FIG. 24 is a side elevational view of the enhanced fish attractor device of FIG. 23.
Figure 25:
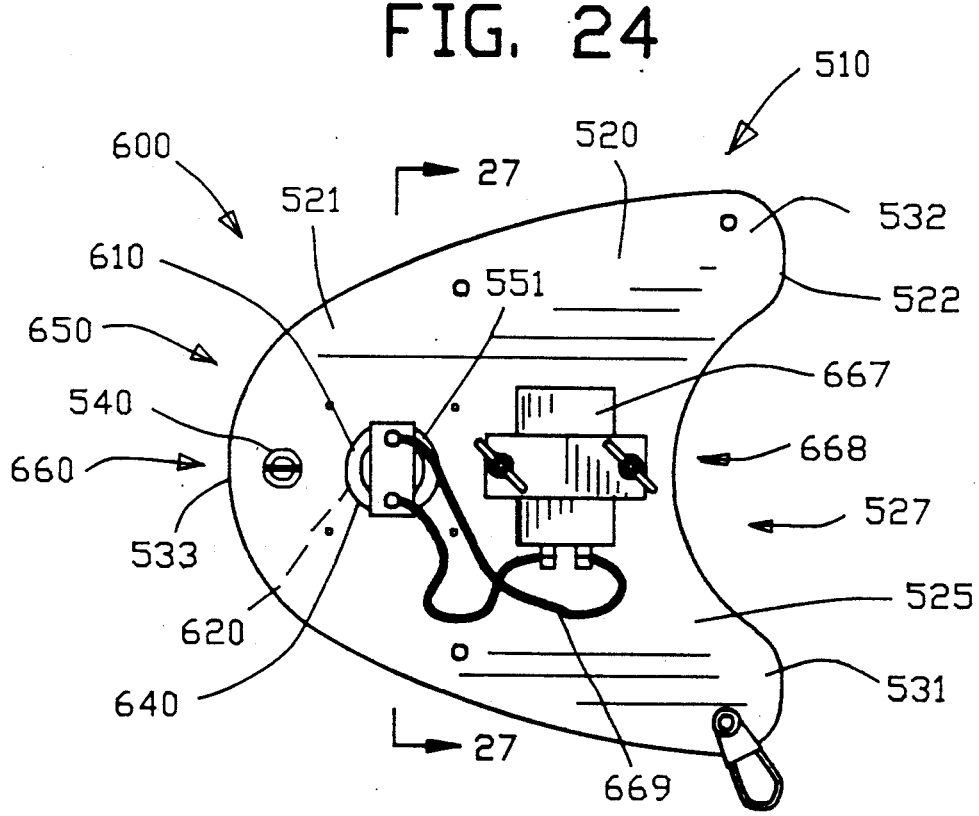
FIG. 25 is a top view of FIG. 24.
Figure 26:
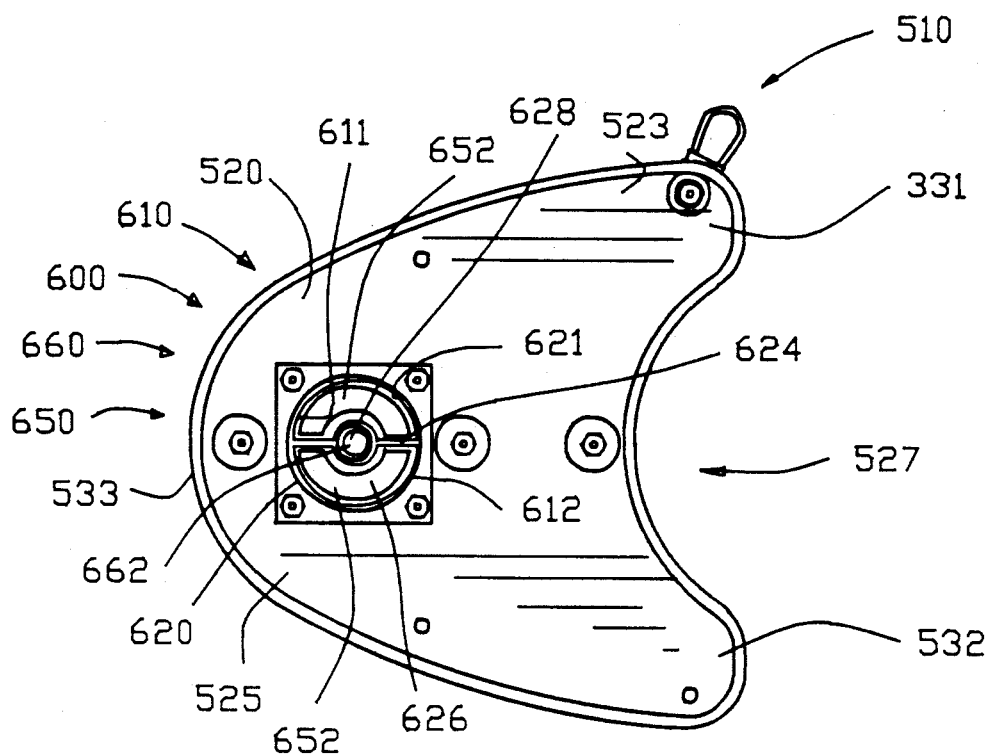
FIG. 26 is a bottom view of FIG. 24.
Figure 27:
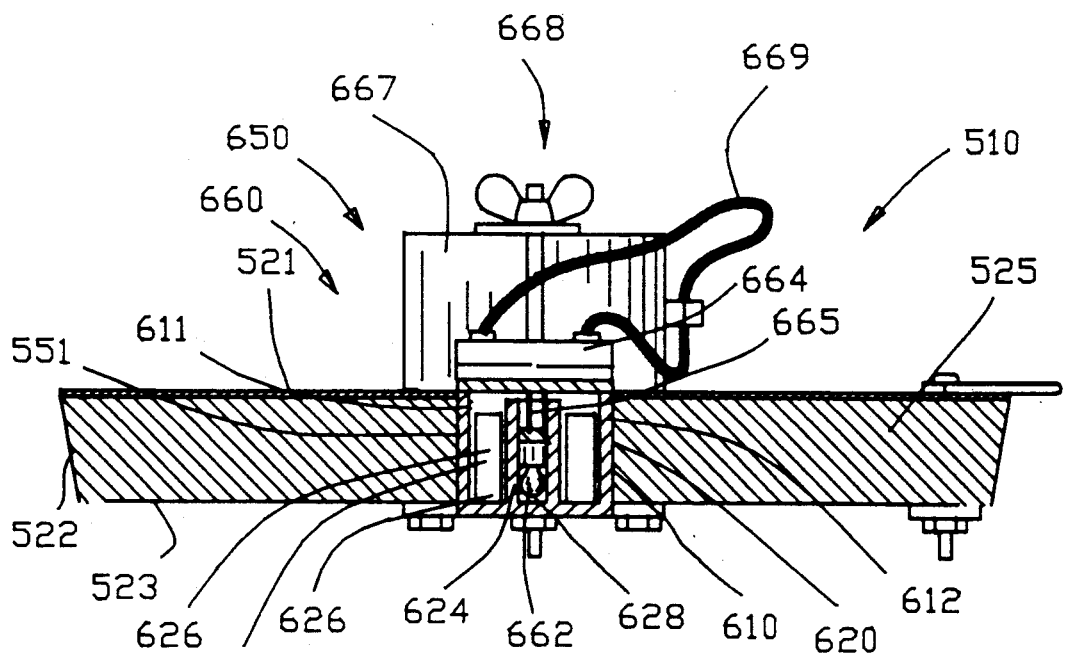
FIG. 27 is an enlarged sectional view along line 27—27 in FIG. 25.

FIG. 23 is an isometric view of a fourth embodiment of an enhanced fish attractor device 510 of the present invention with FIGS. 24–27 illustrating additional views thereof. The enhanced fish attractor device 510 comprises a body member 520 having a body member top surface 521, body member side surface means 522 and a body member bottom surface 523 defining a body member volume 525 for floating on the surface 12 of the body of water 14. The body member 520 has a generally V-shape with a V-shape cut-out 527 for defining a first and a second wing shape 531 and 532 and an apex bow 533 thereby representing the shape of a stingray.

A coupling means 540 is attached to the apex bow 533 of the body member 520 for receiving a rope 542 as heretofore described. A container net 560 has a open top 561 closable by a drawstring 564. The container net 560 includes pores 570 for receiving chum 18 for enabling the chum material 18 to migrate through pores 570 into the body of water 14 for luring the fish 16 thereby. The container net 560 is secured by the drawstring 564 to a fastener 572 extending from the body member 520 for securing the container net 560 to the body member 520.

The enhanced fish attractor device 510 comprises audible means 600 secured to the body member 520 for generating an audible output in the body of water 14 to attract the fish 16 thereby. As best shown in FIGS. 24–27, the audible means 600 comprises a receptacle 610 having an internal surface 611 and an external surface 612 with the internal surface defining an internal receptacle volume 620. An internal partition means 624 is located within the internal receptacle volume 620 for partitioning the internal receptacle volume 620 into a first and a second internal volume 626 and 628.

An aperture 551 is disposed in the body member 520 with the aperture 551 extending between the top surface 521 and the bottom surface 523 of the body member 520. The receptacle 610 is secured within the aperture 551 in the body member 520 with at least a portion of the external surface 612 of the receptacle 610 being disposed below the bottom surface 523 of the body member 520. The receptacle 610 may be secured with the aperture 551 in the body member 520 by either mechanical or adhesive fastening or by a friction fit.

An audio generator 650 is disposed in the first internal volume 626 of the receptacle 610 for generating an audible signal in the body of water 14 to attract the fish 16 thereby. In this embodiment, the audio generator 650 comprises a conventional electronic audio generator 652 disposed in the first internal volume 626 of the internal receptacle volume 620 for generating an audible signal. For example, the electronic audio generator 652 may comprise a solid state oscillator for producing a desired audio signal for attracting fish thereby.

An illumination means 660 is secured to the body member 520 for illuminating the body of water 14 to attract the fish 16 thereby. In this embodiment, the illumination means 660 comprises intermittent illuminating means for intermittently illuminating the body of water 14. The intermittent illuminating means 660 comprises a bulb 662 disposed in the second internal volume 628 of the internal receptacle volume 620 of the receptacle 610. The bulb 662 is connected to a pulsating power source 664 by electrical connectors 665 with the pulsating power source 664 receiving power from a battery 667 through electrical connectors 669. A battery fastener shown generally as 668 removably secures the battery 667 to the body member 520. The electronic audio generator 652 may be likewise connected to the battery 667 by conventional electrical connectors (not show).

The receptacle 610 is transparent for allowing intermittent light from the illumination means 660 to project downwardly into the body of water 14 to visually attract the fish 16 within the body of water 14. The audio signals and illumination of this embodiment of the invention provides a novel apparatus for attracting fish 14.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An enhanced fish attractor device for use on a surface of a body of water to entice fish with a chum material, comprising:
    a body member having a body member top surface, a body member bottom surface and body member side surface means;
    said body member top surface, body member bottom surface and body member side surface means defining a body member volume for floating said body member on the surface of the body of water;
    an aperture disposed in said body member with said aperture extending between said top surface and said bottom surface of said body member;
    a container having container side surface means extending from a container bottom surface for defining a container internal volume;
    said container side surface including a container peripheral rim for defining an open top of said container;
    said container being receivable within said aperture in said body member with said container peripheral rim of said container engaging with said top surface of said body member and with said container bottom surface disposed below the surface of the body of water;
    said container side surface means being porous for enabling the chum material to be inserted within said container internal volume and to migrate through said container side surface means into the body of water for luring fish with the chum material; and
    audible means secured to said body member for generating an audible output in the body of water to attract fish thereby.

2. An enhanced fish attractor device as set forth in claim 1, wherein said audible means comprises a receptacle having an interior surface defining an internal receptacle volume and an external surface;
    means securing said receptacle to said body member with at least a portion of said external surface contacting the body of water;
    said audio generator being disposed in said internal receptacle volume for generating an audible signal; and
    said receptacle transferring said audible signal from said internal receptacle volume to said external surface of said receptacle for generating the audible output in the body of water.

3. An enhanced fish attractor device as set forth in claim 1, wherein said audible means comprises a receptacle having an interior surface defining an internal receptacle volume and an external surface;
    means securing said receptacle to said body member with at least a portion of said external surface contacting the body of water;
    said audio generator comprising a movable mass disposed in said internal receptacle volume for generating an audible signal upon said movable mass impacting said interior surface of said receptacle: and
    said receptacle transferring said audible signal from said internal receptacle volume to said external surface of said receptacle for generating the audible output in the body of water.

4. An enhanced fish attractor device as set forth in claim 1, wherein said audible means comprises a receptacle having an interior surface defining an internal receptacle volume and an external surface;
    means securing said receptacle to said body member with at least a portion of said external surface contacting the body of water;
    said audio generator comprising a spherical movable mass disposed in said internal receptacle volume for generating an audible signal upon said movable mass impacting said interior surface of said receptacle due to wave movement of the body of water; and
    said receptacle transferring said audible signal from said internal receptacle volume to said external surface of said receptacle for generating the audible output in the body of water.

5. An enhanced fish attractor device as set forth in claim 1, wherein said audible means comprises a receptacle having an interior surface defining an internal receptacle volume and an external surface;

means securing said receptacle to said body member with at least a portion of said external surface contacting the body of water;

said audio generator comprising an electronic audio generator disposed in said internal receptacle volume for generating an audible signal; and said receptacle transferring said audible signal from said internal receptacle volume to said external surface of said receptacle for generating the audible output in the body of water.

6. An enhanced fish attractor device as set forth in claim 1, wherein said audible means comprises a receptacle having an interior surface defining an internal receptacle volume and an external surface having a receptacle peripheral rim;

a second aperture disposed in said body member with said second aperture extending between said top surface and said bottom surface of said body member;

said receptacle being secured within said second aperture in said body member with said receptacle peripheral rim engaging with said top surface of said body member and with at least a portion of said external surface of said receptacle disposed below the surface of the body of water;

said audio generator being disposed in said internal receptacle volume for generating an audible signal; and said receptacle transferring said audible signal from said internal receptacle volume to said external surface of said receptacle for generating the audible output in the body of water.

7. An enhanced fish attractor device as set forth in claim 1, including illumination means secured to said body member for illuminating the body of water to attract fish thereby.

8. An enhanced fish attractor device as set forth in claim 1, including illumination means secured to said body member for illuminating the body of water to attract fish thereby; and said illumination means including intermittent illuminating means for intermittently illuminating the body of water.

9. An enhanced fish attractor device as set forth in claim 1, wherein said audible means comprises a receptacle having an interior surface defining an internal receptacle volume and an external surface;

means securing said receptacle to said body member with at least a portion of said external surface contacting the body of water;

said audio generator being disposed in said internal receptacle volume for generating an audible signal;

said receptacle transferring said audible signal from said internal receptacle volume to said external surface of said receptacle for generating the audible output in the body of water; and illumination means disposed in said internal receptacle volume of said receptacle for illuminating the body of water to attract fish thereby.

10. An enhanced fish attractor device as set forth in claim 1, wherein said audible means comprises a receptacle having an interior surface defining an internal receptacle volume and an external surface;

internal partition means for partitioning said internal receptacle volume into a first and a second internal volume;

means securing said receptacle to said body member with at least a portion of said external surface contacting the body of water;

said audio generator being disposed in said first internal volume of said internal receptacle volume for generating an audible signal;

said receptacle transferring said audible signal from said first internal volume of said internal receptacle volume to said external surface of said receptacle for generating the audible output in the body of water; and illumination means disposed in said second internal volume of said internal receptacle volume of said receptacle for illuminating the body of water to attract fish thereby.

11. An enhanced fish attractor device as set forth in claim 1, including a locating light secured to said body member for indicating the position of the enhanced fish attractor device.

12. An enhanced fish attractor device as set forth in claim 1, including a locating flag secured to said body member for locating said body member; and a locating light secured to said locating flag for indicating the position of the enhanced fish attractor device.

13. An enhanced fish attractor device for use on a surface of a body of water to entice fish with a chum material, comprising:

a body member having a body member top surface, a body member bottom surface and body member side surface means;

said body member top surface, body member bottom surface and body member side surface means defining a body member volume for floating said body member on the surface of the body of water;

an aperture disposed in said body member with said aperture extending between said top surface and said bottom surface of said body member;

a container having container side surface means extending from a container bottom surface for defining a container internal volume;

said container side surface including a container peripheral rim for defining an open top of said container;

said container being receivable within said aperture in said body member with said container peripheral rim of said container engaging with said top surface of said body member and with said container bottom surface disposed below the surface of the body of water;

said container side surface means being porous for enabling the chum material to be inserted within said container internal volume and to migrate through said container side surface means into the body of water for luring fish with the chum material; and a plurality of flexible webs each having a first and a second web end with said first ends of each of said plurality of webs being secured to said body member enabling said plurality of webs to be immersed in the body of water for simulating seaweed.

14. An enhanced fish attractor device as set forth in claim 13, wherein said plurality of flexible webs are constructed of a polymeric material.

15. An enhanced fish attractor device as set forth in claim 13, wherein said body member has a body member longitudinal length; and each of said plurality of flexible webs having a web longitudinal length of approximately one-half of said body member longitudinal length of said body member.

16. An enhanced fish attractor device as set forth in claim 13, wherein said body member has a body member perimeter; and each of said plurality of flexible webs being uniformly secured about said body member perimeter of said body member.

17. An enhanced fish attractor device for use on a surface of a body of water to entice fish, comprising:

a body member having a body member top surface, a body member bottom surface and body member side surface means;

said body member top surface, body member bottom surface and body member side surface means defining a body member volume for floating said body member on the surface of the body of water;

audible means secured to said body member for generating an audible output in the body of water to attract fish thereby;

illumination means secured to said body member for illuminating the body of water for enhancing the attraction of fish thereby;

said audible means comprising a receptacle having an interior surface defining an internal receptacle volume and an external surface;

means securing said receptacle to an aperture in said body member with at least a portion of said external surface contacting the body of water;

said audio generator being disposed in said internal receptacle volume for generating an audible signal; and said receptacle transferring said audible signal form said internal receptacle volume to said external surface of said receptacle for generating the audible output in the body of water.

18. An enhanced fish attractor device as set forth in claim 17, wherein said audio generator comprises a spherical movable mass disposed in said internal receptacle volume for generating an audible signal upon said movable mass impacting said interior surface of said receptacle due to wave movement of the body of water; and said receptacle transferring said audible signal from said internal receptacle volume to said external surface of said receptacle for generating the audible output in the body of water.

19. An enhanced fish attractor device as set forth in claim 17, wherein said audio generator comprises an electronic audio generator disposed in said internal receptacle volume for generating an audible signal; and said receptacle transferring said audible signal from said internal receptacle volume to said external surface of said receptacle for generating the audible output in the body of water.

20. An enhanced fish attractor device as set forth in claim 17, wherein said receptacle has a receptacle peripheral rim;

said aperture disposed in said body member with said aperture extending between said top surface and said bottom surface of said body member; and said receptacle being secured within said aperture in said body member with said receptacle peripheral rim engaging with said top surface of said body member and with at least a portion of said external surface of said receptacle disposed below the surface of the body of water.

21. An enhanced fish attractor device as set forth in claim 17, wherein said illumination means includes intermittent illuminating means for intermittently illuminating the body of water.

22. An enhanced fish attractor device as set forth in claim 17, including internal partition means for partitioning said internal receptacle volume into a first and a second internal volume;

said audio generator being disposed in said first internal volume of said internal receptacle volume for generating an audible signal; and illumination means disposed in said second internal volume of said internal receptacle volume of said receptacle for illuminating the body of water to attract fish thereby.

* * * * *